A. DAVIDSON.
PULLEY.
APPLICATION FILED OCT. 27, 1920.
1,429,491. Patented Sept. 19, 1922.
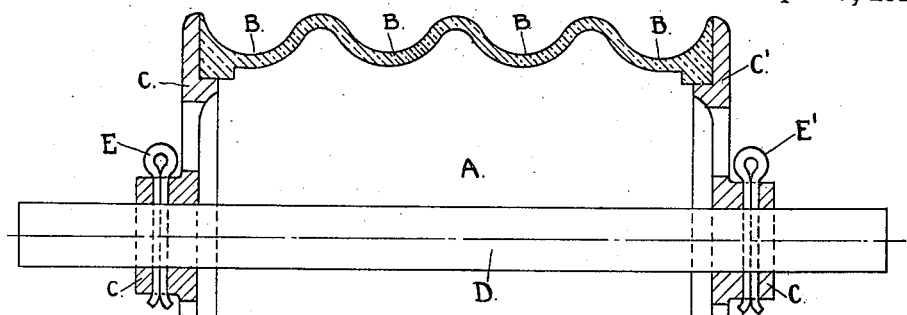
FIG. 1
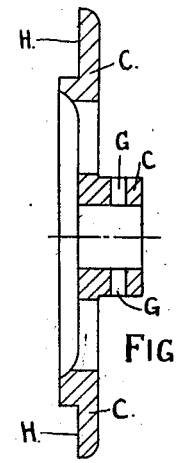
FIG. 2.  FIG. 4.
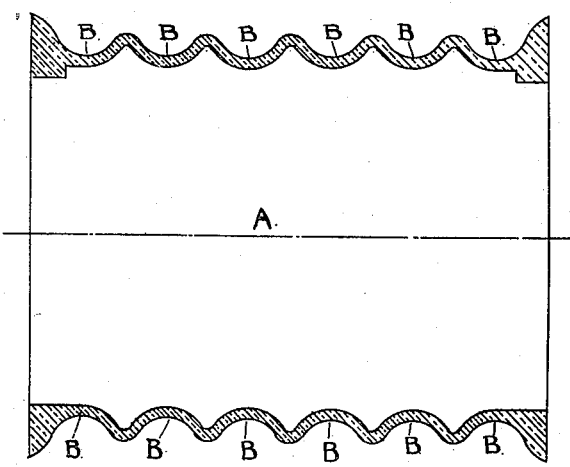
FIG. 3.
Inventor—
Arthur Davidson,
By B. Singer,
Atty.

Patented Sept. 19, 1922.

1,429,491

UNITED STATES PATENT OFFICE.

ARTHUR DAVIDSON, OF RENFREW, SCOTLAND.

PULLEY.

Application filed October 27, 1920. Serial No. 420,002.

*To all whom it may concern:*

Be it known that I, ARTHUR DAVIDSON, of Wellwood, Broadloan, Renfrew, Scotland, engineer, have invented certain new and useful Improvements in Pulleys, of which the following is a specification.

My invention relates to improvements in and connected with haulage and winding rollers and pulleys and has for its object to so construct these as to have a much longer life than these in existence, as well as a saving on the wire rope.

In carrying out my invention, I construct the body of the roller in the form of a series of straight or plain grooves of any size suitable to the diameter of rope and so designed that they are in contact continually with one third of the circumference of the rope under which they are running, and the grooves are also made the same diameter as that of the rope. The roller has also interchangeable ends, each having a projecting boss on the outside with a hole for a spindle and with holes cut transversely for split pins for fastening the drum to the spindle.

In order that my invention may be properly understood and readily carried into effect, I have hereunto appended one sheet of drawings, of which—

Figure 1 is a sectional elevation illustrating my invention.

Figure 2 is an end view.

Figure 3 is a sectional elevation of a roller with smaller grooves.

Figure 4 is a cross sectional view of one of the end plates.

Referring to the drawings, A is the roller and B are the grooves while C, C¹ are the interchangeable ends having a projecting boss c through which a hole is bored to suit the diameter of the spindle D to be used. At right angles to this and at a fixed distance from the face H a hole G is bored suitable for the split pins E, E¹, to retain the spindle D in position. The spindle is put in a jig and two holes of the same size as G are bored at a fixed distance from each other. The plate is cast exactly the same size as the inside diameter of the roller body and has a flat cut on one side coinciding with a flat inside the roller (see Figure 2) which ensures that the complete roller is turning. These two end plates C, C¹ are then put on to a body which has been turned to a fixed length. The spindle D is put through the holes in the end plates and the split pin holes in the ends and spindle coincide exactly. Two split pins are then driven through the holes and the roller is complete.

All the parts are made to jigs, so that any part wearing out can be repaired by another standard part, and the construction is so simple that a totally unskilled person can take down and reassemble the roller in less than two minutes.

It will be obvious from the above that a new body can be easily and readily replaced without as at present, the trouble and expense of a complete roller and spindle by simply withdrawing the split pins E, E¹, removing the spindle D and then giving the ends C, C¹ a gentle tap.

When the rope is running the complete roller and spindle will be in motion as would be the case if the whole were cast in one piece.

Claim:

A drum, plates closing the ends of the drum and each having an annular flange entering the drum and a circumferential flange bearing against one end of the drum, said flange having a flat portion, said drum also having flat portions engaging those of the plates, and each plate also having a central bore and an outstanding hub, a spindle extending through the drum and through the bores and hubs of the plates, and split pins arranged in openings in the hubs and spindle, detachably securing the plates to the spindle and also detachably securing the plates on the ends of the drum.

In witness whereof I affix my signature in presence of two witnesses.

ARTHUR DAVIDSON.

Witnesses:
JOHN TRAIN LIDDLE,
VEDA HELEN KYLE LIDDLE.